United States Patent [19]

Araki et al.

[11] Patent Number: 4,637,004

[45] Date of Patent: Jan. 13, 1987

[54] OPTICAL DATA READING DEVICE

[75] Inventors: Yoshitsugu Araki; Taichi Akiba, both of Saitama, Japan

[73] Assignee: Pioneer Electronic Corporation, Tokyo, Japan

[21] Appl. No.: 715,155

[22] Filed: Mar. 22, 1985

[30] Foreign Application Priority Data

Mar. 24, 1984 [JP] Japan .............................. 59-42153[U]

[51] Int. Cl.[4] .............................................. G11B 7/095
[52] U.S. Cl. ........................................ 369/44; 369/45
[58] Field of Search ..................... 369/44, 45, 46, 215, 369/111

[56] References Cited

U.S. PATENT DOCUMENTS

| | | | |
|---|---|---|---|
| 4,183,060 | 1/1980 | Barnette et al. | 369/45 |
| 4,300,226 | 11/1981 | Barnette et al. | 369/45 |
| 4,321,701 | 3/1982 | Arquie et al. | 369/45 |
| 4,414,657 | 11/1982 | Arquie et al. | 369/45 |

Primary Examiner—Donald McElheny, Jr.
Attorney, Agent, or Firm—Finnegan, Henderson, Farabow, Garrett & Dunner

[57] ABSTRACT

An optical data reading device wherein an optical pick-up head (10), which reads the light reflected from a disk data recording carrier (1) by detecting a light flux (8) onto a data track of the disk, is movable radially of the disk along a carrier (15) that is tiltable about an axis (18). The spacing between the optical pick-up head and the disk may then be kept almost constant by tilting the mounting plate and optical pick-up head in response to an output signal of a detector which detects warp of the disk.

5 Claims, 7 Drawing Figures

OPTICAL DATA READING DEVICE

BACKGROUND OF THE INVENTION

The present invention relates to an optical data reading device for reading data from a disk type recorded data carrier.

FIG. 1 is a side elevational view of a prior art device where a disk 1 has no warp and a spacing A between the disk 1 and an optical pick-up head 3 is kept constant. The disk 1 is rotated by a motor-driven spindle 2.

The optical pick-up head 3 is held close to the underside of the disk 1 by a transfer base 4 and is pivotable on the base 4 about a shaft 5.

The transfer base 4 can be moved to and fro in the radial direction of the disk 1 along a guide rail 6 by a transfer mechanism (not shown), thereby forming a feed mechanism.

The optical pick-up head 3 is provided with an objective lens 7, and the disk 1 is irradiated with a light flux 8 which is focused through the objective lens 7, in order to read data stored on the disk.

In FIG. 2, the disk 1 is shown warped and as a result the spacing between the disk 1 and optical pick-up head 3 changes to B. The disk 1 is warped upward, and the optical pick-up head 3 is pivoted around the shaft 5 so that the head is maintained substantially parallel to the adjacent part of the disk.

However, although the pick-up head 3 may follow the tilting component of warp of the disk 1, it cannot follow the component of vertical displacement of the disk 1. Therefore, it is necessary to use fully the function of an automatic focusing device in the optical pick-up head 3 such as the objective lens 7. As a result, the automatic focusing device must have a tracking range large enough to compensate for maximum warp of the disk 1. This may not always be convenient.

Thus, the spacing A between the disk 1 and the optical pick-up head 3 in the example of FIG. 1 changes to B in FIG. 2 and the distance (B-A) may not be fully compensated.

SUMMARY OF THE INVENTION

It is desirable to eliminate this disadvantage of the prior art and therefore it is an object of the present invention to provide an optical data reading device which is capable of keeping almost the same the angle of an optical pick-up head and a warped disk as well as their initial spacing, thereby reducing the necessary range of a focus-compensating control and simplifying the structure and reducing the size of the optical pick-up head.

According to the invention, an optical data reading device comprises means for supporting and rotating a disk; an optical pick-up head which reads data by focusing light, in use, onto a data track of the disk and detecting the light reflected from the data track; a carrier for supporting the head; means for moving the head to and fro along the carrier radially of the disk; and means for tilting the carrier about an axis extending perpendicularly to an axial plane of the disk containing the radial direction of movement of the head; whereby variation in the spacing of the head from the disk owing to warp of the disk may be at least partially compensated.

Preferably, the device further comprises a warp detector for sensing warp of the disk and providing a compensating signal, the tilting means being responsive to the compensating signal.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 4:
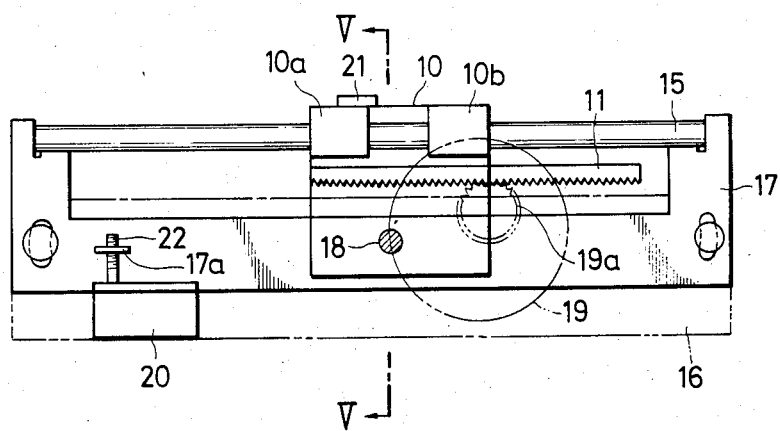
FIG. 4 is a front elevation of the FIG. 3 device.
Figure 3:
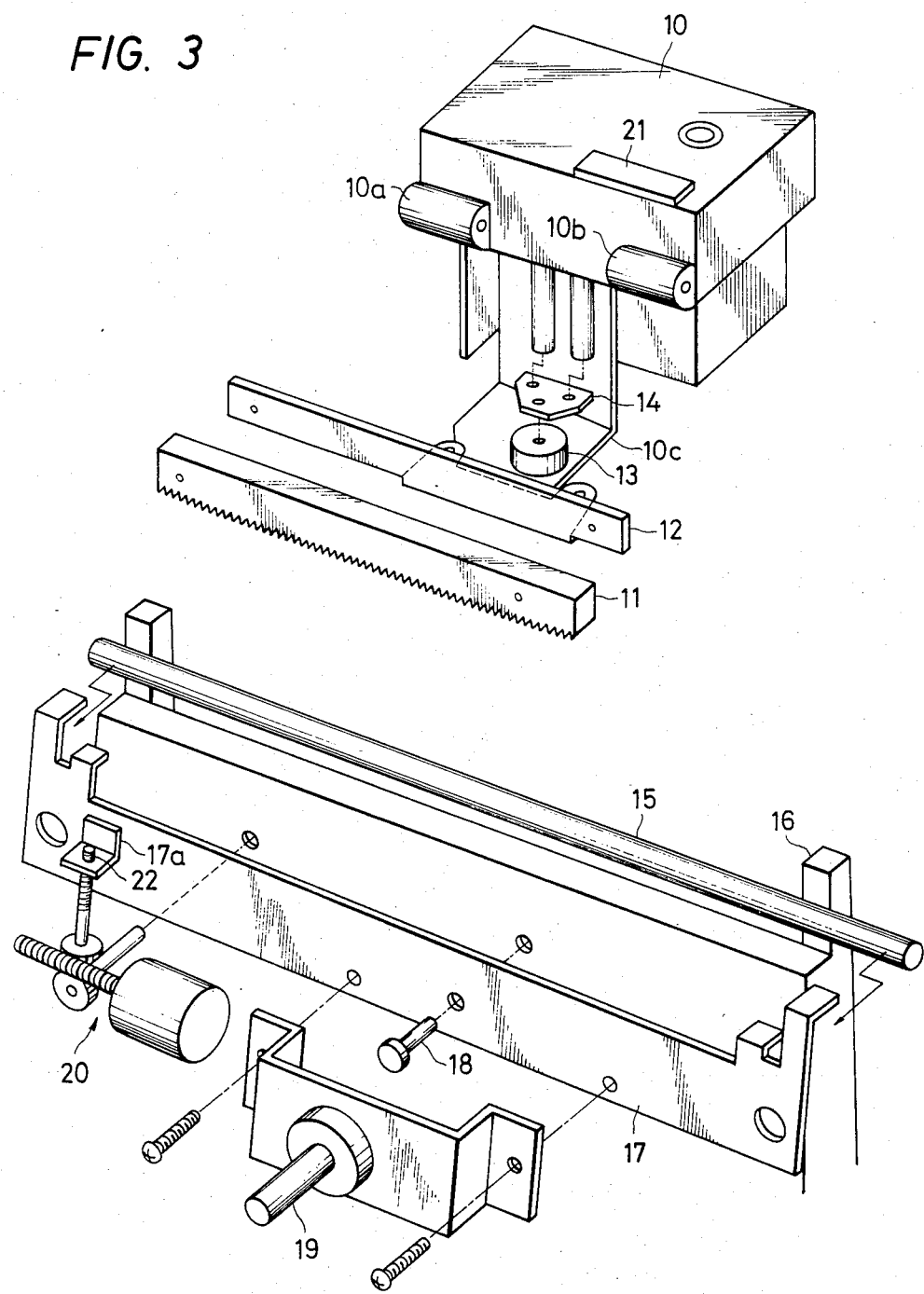
FIG. 3 is an exploded perspective view showing part of an optical data reading device according to the present invention.
Figure 5:
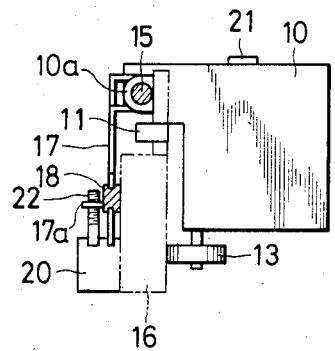
FIG. 5 is a section taken on the line V—V in FIG. 4.

In FIGS. 3 to 5, reference numeral 10 denotes an optical pick-up head. A pair of short, part-cylindrical supporting portions 10a, 10b are integrally formed near the upper end edges of the front of the head 10. A guide rail 15 passes through the supporting portions 10a, 10b and the head 10 is capable of moving in the radial direction of a disk 1 along the guide rail 15.

An L-shaped supporting plate 10c is provided at the lower part near the front of the head 10 and a roller 13 is attached to the supporting plate 10c via a roller mounting plate 14.

A rack mounting plate 12 is also attached to the head 10 with the roller 13 and roller mounting plate 14, and a rack 11 is attached to the rack mounting plate 12. The rack 11 enables the optical pick-up head 10 to move in the radial direction of disk, because, as shown in FIG. 4, the rack 11 engages with a pinion 19a driven by a motor unit 19. Upon operation of the motor unit 19, the rack 11 moves to the right or left in the radial direction of the disk and the head 10 also moves in the radial direction along the guide rail 15.

The motor unit 19 for transfer in the radial direction is attached to a mounting plate 17 located in the axial plane containing the direction of movement of the head. This mounting plate 17 supports the guide rail 15. The mounting plate 17 is pivotably attached to a base 16 about a shaft 18 extending perpendicularly to the plane. The shaft 18 is provided within the range of radial transfer of the head 10.

The base 16 is fixed relatively to a motor (not shown) for rotating the spindle 2. A tilt motor unit 20 is fixed near the left end of the base 16. The end 22 of an output shaft of this tilt motor unit 20 is threaded as a male lead screw. A complementary nut device 17a is attached near to the left end of the mounting plate 17. The device 17a is engaged with the lead screw part 22 of the output shaft.

Reference numeral 21 denotes a detector which detects a tilt or inclination of the disk 1, relatively to the optical pick-up head 10.

When the tilt motor unit 20 is operated, the mounting plate 17 pivots about the shaft 18. The guide rail 15 and optical pick-up 10 are then inclined against to conform to the inclination of the part of the disk adjacent to the head.

Meanwhile, warp data of the disk is obtained by the disk tilt detector 21. It is also possible for the user to obtain the warp data of the disk by adjusting variable resistors through observation of a display screen. When a compensating signal from the detector or otherwise is applied to the tilt motor nit 20 in accordance with such warp data, the guide rail 15 and optical pick-up head 10 tilt with the mounting plate 17 around the shaft 18 and the optical pick-up head 10 and disk can be kept substantially parallel.

When the motor unit 19 for transfer in the radial direction operates, the rack 11 is moved to the right or left by the opinion 19a. The optical pick-up head 10 then moves in the radial direction of disk along the guide rail 15.

Figure 1:
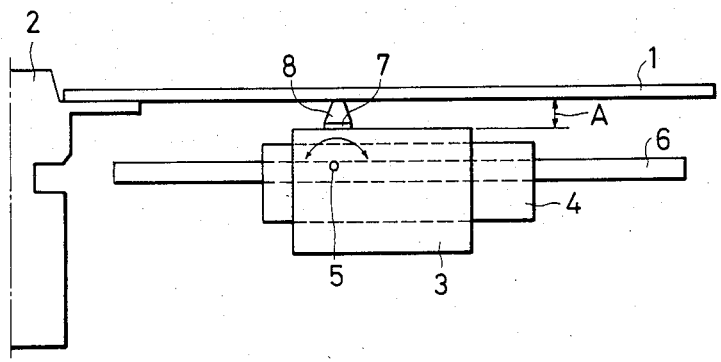
FIG. 1 is a side elevation indicating the principle of operation of a transfer device of an optical data reading device of the prior art with no disk warp.
Figure 2:
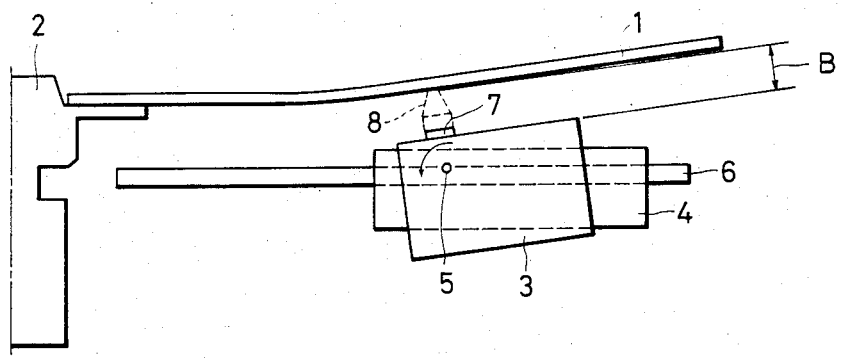
FIG. 2 is a side elevation similar to FIG. 1, but indicating the operation of the prior art device with a warped disk.
Figure 6:
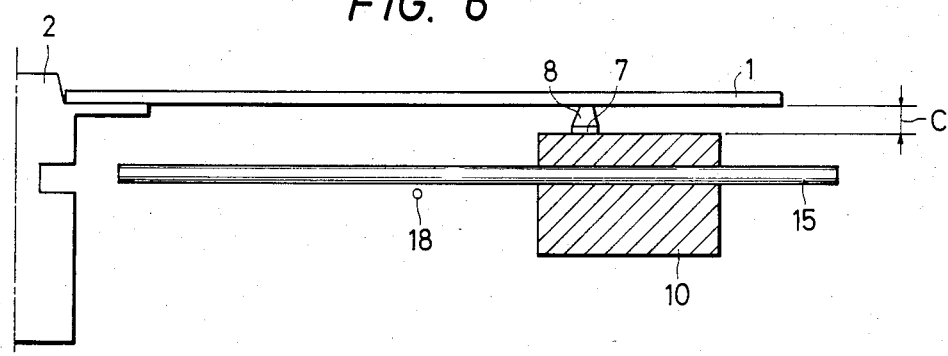
FIG. 6 is a side elevation indicating the principle of operation of the FIGS. 3 to 5 device when there is no disk warp.
Figure 7:
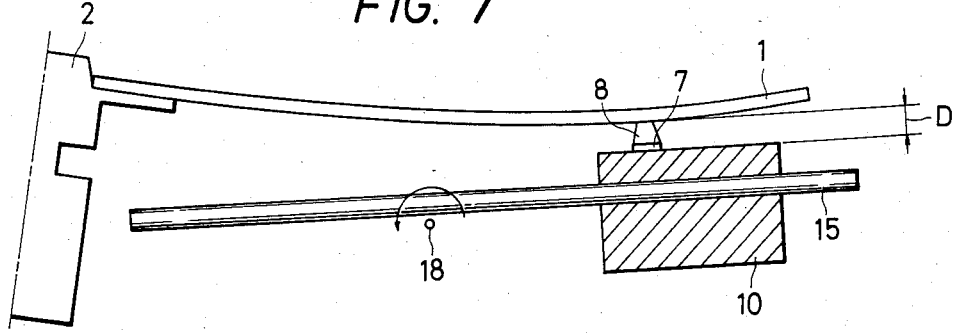
FIG. 7 is a side elevation similar to FIG. 6, but indicating the principle of operation with a warped disk.

FIGS. 6 and 7 respectively correspond to FIGS. 1 and 2 of the prior art. In FIGS. 6 and 7, the disk 1, spindle motor 2, objective lens 7 and light flux 8 are given the same numerals as those in FIGS. 1 and 2 and the optical pick-up head 10, guide rail 15 and shaft 18 are given the same numerals as those in FIGS. 3 to 5. In FIG. 6, warp is not present in the disk and a spacing C between the disk 1 and head 10 is constant, but in FIG. 7, warp is present and upward warp is generated. In the case of FIG. 7, the tilt motor unit 20 operates and the mounting plate 17 and guide rail 15 pivot about the shaft 18. The optical pick-up head 10 is thus brought close to the disk 1 as it is tilted.

Accordingly, even after the tilt of the optical pick-up head 10 is compensated for, the spacing between the disk 1 and the optical pick-up head 10 can be kept constant to D which is almost equal to the spacing C for an unwarped disk. Moreover, the angle and spacing between the disk 1 and optical pick-up head 10 can be kept almost constant by adequately selecting the position of the shaft 18.

As explained above, the transfer device of the optical data reading device of the present invention enables an optical pick-up head, which reads the light reflected from a disk data recording carrier by a converging light flux on a data track of the disk, to be simplified and reduced in size, as the range of a focus compensating control can be narrowed.

What is claimed:

1. An optical data reading device comprising means for supporting and rotating a disk; an optical pick-up head which reads data by focusing light, in use, onto a data track of the disk and detecting the light reflected from the data track; a carrier for supporting the head; means for moving the head to and fro along the carrier radially of the disk; and means for tilting the carrier about an axis extending perpendicularly to an axial plane of the disk containing the radial direction of movement of the head; whereby variation in the spacing of the head from the disk owing to warp of the disk may be at least partially compensated.

2. A device according to claim 1, wherein the carrier comprises a plate located in the axial plane and pivoted about the axis on a base; and guide rail means which is fixed to the plate and along which the head is slidable.

3. A device according to claim 2, wherein the tilting means comprises a tilt motor mounted on the base and coupled to the plate by a lead screw.

4. A device according to claim 2, wherein the head-moving means comprises a motor mounted on the plate and driving a pinion which engages a rack fixed to the head.

5. A device according to claim 1, further comprising a warp detector for sensing warp of the disk and providing a compensating signal, the tilting means being responsive to the compensating signal.

* * * * *